United States Patent [19]

Rueger

[11] 4,399,936
[45] Aug. 23, 1983

[54] PANTOCAM WEB THREADING APPARATUS

[75] Inventor: William J. Rueger, Pima County, Ariz.

[73] Assignee: International Business Machines Corp., Armonk, N.Y.

[21] Appl. No.: 315,112

[22] Filed: Oct. 26, 1981

[51] Int. Cl.³ .......................... G03B 1/04; G03B 1/56
[52] U.S. Cl. ...................................... 226/92; 226/91; 242/195
[58] Field of Search .................. 226/92, 91; 242/195; 74/569

[56] References Cited

U.S. PATENT DOCUMENTS

| | | | |
|---|---|---|---|
| 1,979,195 | 10/1934 | Govare et al. | 74/569 X |
| 3,149,592 | 9/1964 | Casas-Robert | 74/569 X |
| 3,227,387 | 1/1966 | Laa et al. | 242/195 X |
| 3,414,269 | 12/1968 | Appel | 242/195 X |
| 4,334,656 | 6/1982 | Crawford et al. | 242/195 |
| 4,335,858 | 6/1982 | Cranna | 226/91 X |

FOREIGN PATENT DOCUMENTS 687478 5/1964 Canada ................................ 242/195

Primary Examiner—Stuart S. Levy
Assistant Examiner—Lloyd D. Doigan
Attorney, Agent, or Firm—J. A. Pershon; H. F. Somermeyer

[57] ABSTRACT

An automatic threading apparatus using a pantocam for a magnetic tape transport is disclosed. A leader block attached to the free end of the tape in a cartridge is connected to a pick-up pin attached to one end of a broken arm linkage. The broken arm linkage has its second end fastened to a rotatable shaft. The extension of the broken arm linkage is controlled by a follower link which includes a bearing that follows a cam groove. Rotating the broken arm linkage causes the tape from the cartridge to follow the tape path, such as a cucumvoluted path, in a sweeping motion past air bearing guides and a transducer into a take-up reel. The threading pin remains in contact with the leader block which forms a smooth surface for the tape with the take-up reel.

18 Claims, 6 Drawing Figures

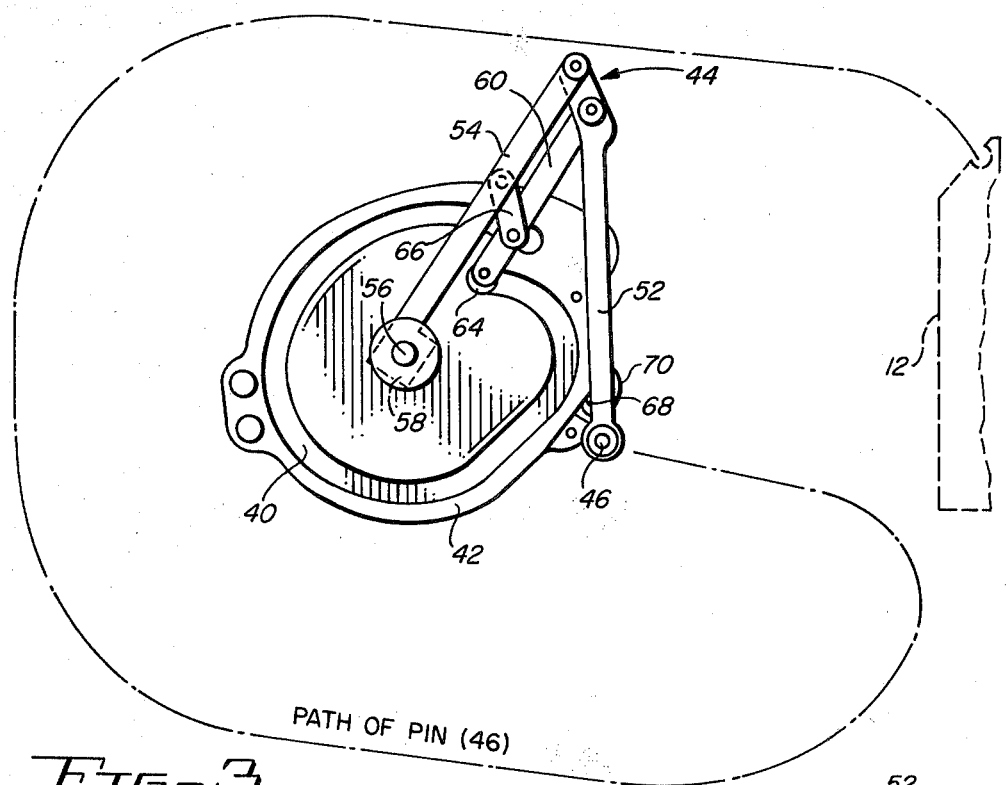
PATH OF PIN (46)
FIG. 3
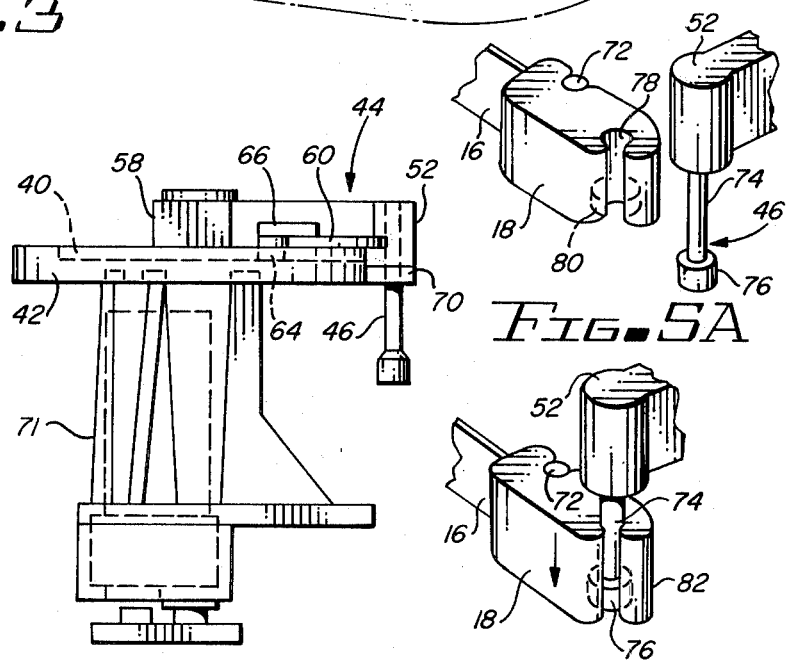
FIG. 4
FIG. 5A
FIG. 5B

PANTOCAM WEB THREADING APPARATUS

BACKGROUND OF THE INVENTION

This invention relates generally to an automatic web threading apparatus and, in particular, to an improved threading apparatus for use with a magnetic tape transport which includes a replaceable supply reel of magnetic tape and directing the end of the magnetic tape to a tape drive mounted take-up reel onto which the tape is wound.

FIELD OF THE INVENTION

Automatic threading systems have been widely used in the feeding of web material from a supply reel to a take-up reel. The present invention can be applied to any web transport apparatus provided with a flexible web, although the present invention is described herein in particular with respect to a magnetic tape cartridge threading apparatus.

DESCRIPTION OF THE PRIOR ART

Techniques have been developed for automatically threading a web material from a supply reel to a take-up reel in order to overcome the problems encountered when a length of tape has to be extracted from the supply reel and threaded through the different stations by an operator. The end of the web must then be automatically attached to the take-up reel by some appropriate means. In a typical prior art automatic threading system, a leader tape is permanently attached to the take-up reel. The leader tape is threaded through the tape drive to a position near the supply reel. The supply reel typically has a connector which can be simply and quickly connected to the trailing edge of the leader tape of the take-up reel. The leader tape and the coupling device then become the substrate for the subsequent wraps of the web on the take-up reel. The leader tape and especially the connector cause a problem in that creases could be formed in the subsequent layers which could ruin the reuse of the tape since the magnetic transitions might occur at the creases. This arrangement made the resensing of the magnetic transitions less reliable.

Slides were then adapted to push a leader block from the supply reel to the take-up reel. The take-up reel could be adapted to accommodate the leader block and thereby provide a smooth surface for subsequent layers of the magnetic tape, for instance. The slides and levers had the problem in that only very simplistic tape paths could be covered. Further, the distance between the supply reel and the take-up reel of necessity had to be very short since the slides and hooks could not any complex tape path.

It is, therefore, an object of the present invention to provide a simple threading apparatus that can cover a complex tape path in particular circumvoluted tape path.

In a copending patent application entitled "Automatic Apparatus for Threading Tape over a Complex Tape Path Including a Continuous Channel Conforming to Said Path" filed on 6/30/80, Ser. No. 6/164,732, now U.S. Pat. No. 4,335,858 and assigned to the assignee of the present invention, a channel is disclosed that is formed to coincide approximately with the path of the tape through the tape drive apparatus. The remaining section of the channel completes the path for the endless band that is disposed for sliding engagement within the channel. Suitable means are provided to drive the band within the channel in a forward and reverse direction. The channel and the band are located in a plane different from the plane produced by the tape as it moves from its supply reel to the take-up reel. A threading pin is attached to the band in the channel. The pin is removably connected to a leader block which is connected to the free end of the magnetic tape and provides the external access for pulling the magnetic tape from the supply reel of the cartridge. Sliding the band within the channel causes the threading pin and the leader block to be pulled along the tape path as determined by the shape of the channel.

It is, therefore, an object of the present invention to provide an improved automatic tape threading mechanism.

A compound patent application entitled "A Constant Force Wind-Up Spring Web Threading System" filed concurrent with the present application and assigned to the assignee of the present invention and bearing Ser. No. 315,120, discloses a threading apparatus for a magnetic tape transport that uses a spring wound on a spool to pull the tape through the complex tape path. A threading pin of the apparatus attaches to a leader block to pull the tape from the supply spool in the cartridge. The threading pin is attached to a rotatable spool that has a constant force spring attached to its hub. The other end of the spring is connected to a cutout in the take-up reel of the tape drive apparatus. The constant force spring operates at a plane different from the plane of the magnetic tape path. A latch holds the spool adjacent to the supply reel. When the cartridge is inserted, the latch releases the spool. The spring on the spool will wind around its hub and pull the threading pin through a tape path such that the leader block is placed into the take-up spool with the leader block forming a part of the hub to permit the smooth surface for the subsequent wraps of the tape around the hub.

Another object of the present invention, therefore, is to provide an improved automatic tape threading mechanism for use with a magnetic tape transport in which a complex tape path, such as but not limited to a path including a near circumvolution, can be negotiated using a cam follower which forces a rotatable pantolink to swing through the tape path and place the tape into the take-up reel.

SUMMARY OF THE INVENTION

In accordance with the present invention, an automatic threading apparatus is provided for moving a leader block attached to the leading edge of a web of material wrapped on a supply reel in a cartridge over a complex web path. The threading apparatus includes a cam substrate having a cam groove formed therein defining the complex web path. A follower bearing is adapted to move along the cam groove. The follower bearing is connected to a follower link. A broken arm linkage is mounted to a rotatable shaft at one end for sweeping the pivot arm in an approximate circular path. The follower link is connected to the broken arm linkage and determines the extension of the broken arm linkage according to the cam groove path. A threading pin selectively couples the leader block to the free end of the broken arm linkage. Rotating the shaft causes the pivot arm to describe a circular path. The follower bearing follows the cam groove and thereby causes the pantoarm to swing through the complex web path as defined by the cam groove. The threading pin is directed from the first defined position adjacent to the cartridge to the take-up reel. The threading pin firmly places the leader block within the take-up reel with the leader block forming a part of the take-up reel to provide a smooth hub substrate for the subsequent layers of the tape.

In the preferred embodiment according to the present invention, a cam groove drives a pantocam arm through a complex tape path. A cartridge having a supply reel of magnetic tape, is placed adjacent to a threading pin. Moving the cartridge to the operating position causes its leader block to be interconnected to the threading pin. The threading pin is connected to an end of a broken arm linkage arrangement. The other end of the broken arm linkage is connected to a rotatable shaft. A pantoarm interconnects a cam follower bearing with the broken arm linkage adjacent to the pivoting connection. A guide link interconnects the pantoarm to the broken arm linkage. Rotating the shaft causes the broken arm linkage to pull the leader block from the cartridge. Continued rotation of the shaft causes the broken arm to sweep a web path determined by the pantoarm as it follows the cam groove. The follower bearing moves within the cam groove and through the pantoarm linkage causing the broken arm linkage to swing through the path into a take-up spool. In rewinding, the supply reel rotates to rewind the web and the shaft is rotated in a reverse direction to cause the leader block to follow the web path in the reverse direction to reinsert the leader block into the cartridge.

A further object of the present invention is to provide a simple mechanism for moving a leader block coupling device of an automatic threading apparatus from a cartridge supply reel to a machine take-up reel.

A more specific object of the invention is to provide a threading device that uses a pantocam arrangement to accomplish the threading of a magnetic tape from a cartridge through a complex tape threading path.

These and other objects of the present invention will become apparent to those skilled in the art as the description.

BRIEF DESCRIPTION OF THE DRAWING

The various novel features of this invention, along with the foregoing and other objects, as well as the invention itself both as to its organization and method of operation, may be fully understood from the following description of illustrated embodiments when read in conjunction with the accompanying drawing, wherein:

FIG. 3 is a top plan view of only the pantocam and pantoarm assembly of FIG. 1;

FIG. 4 is a side plan view of the pantocam and pantoarm assembly of FIG. 3; and

FIGS. 5A and 5B illustrate the coupling involved in connecting the leader block of the cartridge with the threading pin of the threading apparatus of FIG. 1.

DESCRIPTION OF THE PREFERRED EMBODIMENT

Figure 1:
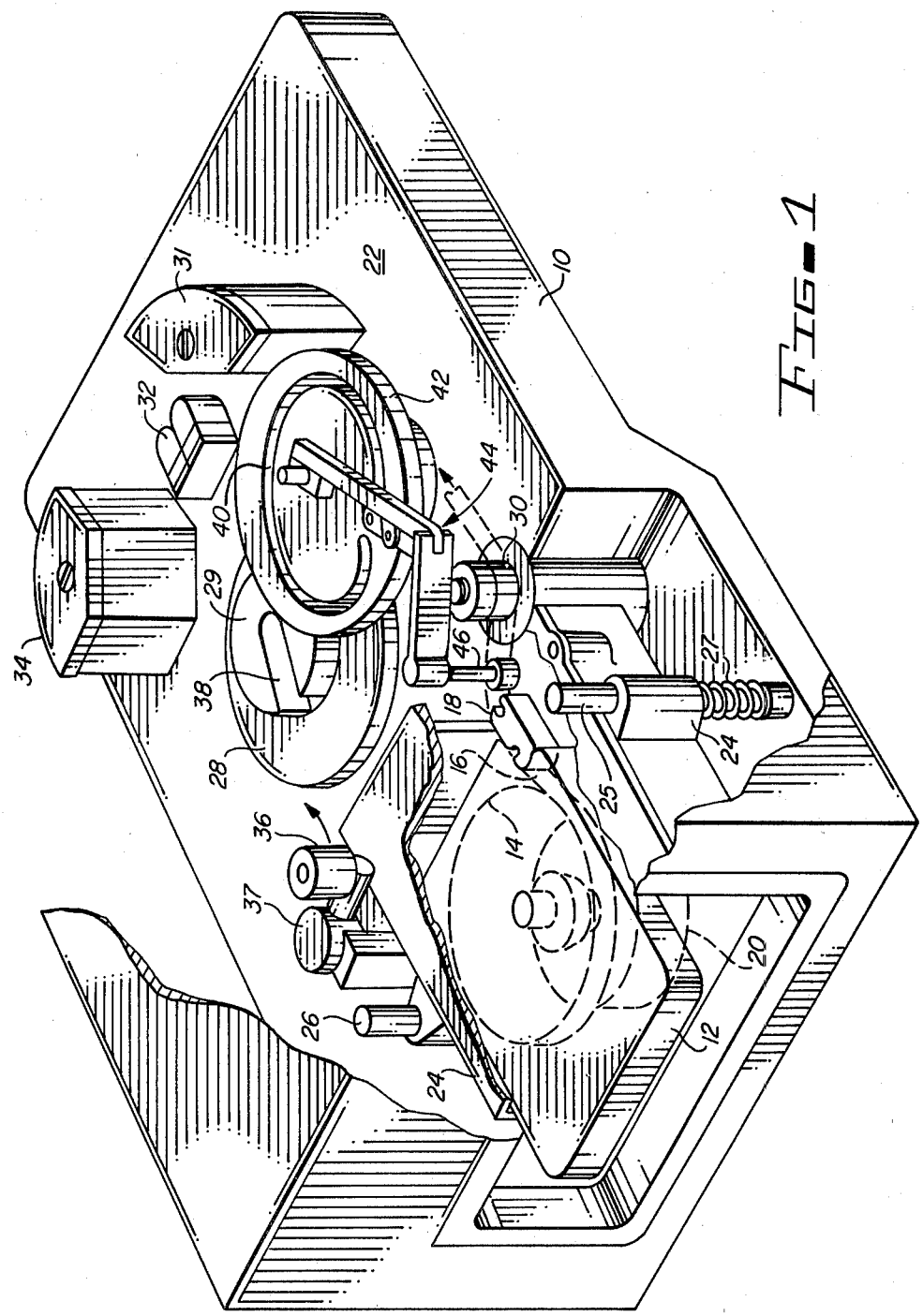
FIG. 1 is a perspective view of a reel-to-reel magnetic tape drive having an automatic threading apparatus embodying the present invention.

Referring to FIG. 1, a reel-to-reel type magnetic tape drive apparatus is shown including the threading apparatus according to the present invention. The tape transport apparatus includes a base plate 10 on which various standard components of a magnetic tape transport are mounted. A supply cartridge 12 is replaceable and includes a reel 14 of magnetic tape 16. A leader block 18 is disposed externally of the cartridge. The leading edge of the tape 16 is attached to the side of the leader block 18. A drive motor 20 for the supply reel 14 is mounted beneath the base plate 10 so that its shaft extends normal to the surface and slightly above the surface 22 of the base plate 10. The motor shaft is provided with a suitable clutching arrangement which permits the motor to be coupled to the hub of the supply reel 14 by movement of the cartridge 12 in a direction normal to the surface 22. As shown, this vertical movement is achieved by the cartridge loading mechanism, a portion of which is designated by reference character 24, along shafts 25 and 26 against springs mounted on the shafts, one shown at reference numeral 27.

A take-up reel 28 is permanently attached to a motor (not shown) which is mounted to the base plate 10 in a suitable fashion. The supply reel 14, when coupled to its motor 20, lies in substantially the same plane as a hub 29 of the take-up reel 28 so that a point on the tape 16 moves when being transported in a plane normal to both motor shafts. After the threading of the tape according to the present invention, transfer of the tape 16 between the supply reel 14 and the take-up reel 28 is achieved by control of the respective driving motors for the reels as is well known in the art for reel-to-reel tape drives. The tape 16 passes a roller guide 30, an air bearing guide 31, a magnetic transducer head 32, a second air bearing guide 34, and a roller 36 of a tension transducer 37. The guide bearing 31 and 34 are positioned in the tape path so that the magnetic pigment side of the magnetic tape 16 slides over their air bearing surfaces with the magnetic tape 16 coacting with the magnetic head 32 to read and write magnetic transitions to and from the magnetic tape 16.

The function of each of the components described above is well known in the art. Since the specific details of these components form no part of the present invention, they have not been illustrated or described in detail. The details of the shape of the leader block 18, the construction of the hub 29 of the take-up reel 28, and the relationship of these elements to each other, is disclosed in copending application Ser. No. 6/164,733, filed on 6/30/80, now U.S. Pat. No. 4,334,656 assigned to the assignee of the present invention. As discussed in that application, the hub 29 of the take-up reel 28 is provided with a radially extending slot 38 for receiving the end of the leader block 18 which is permanently attached to the end of the tape 16 from the supply reel 14. The relationship is such that when the leader block 18 is inserted into the slot 38 by movement of the leader block in a radially direction, the tape 16 attached thereto is positioned to be wrapped on the hub 36 by merely rotating the take-up reel 28 since the length of the slot 38 corresponds generally to the length of the leader block 18. During the winding process, the leader block 18 is maintained in the slot 38 of the take-up reel 28. The automatic threading apparatus disclosed in that application generally provides two functional aspects. The first involves moving and guiding a coupling device from the supply reel to the take-up reel, and the second involves selectively coupling the leader block at the supply reel in a manner to permit the leader block to be rotated with the take-up reel without being uncoupled from the threading apparatus.

Figure 2:
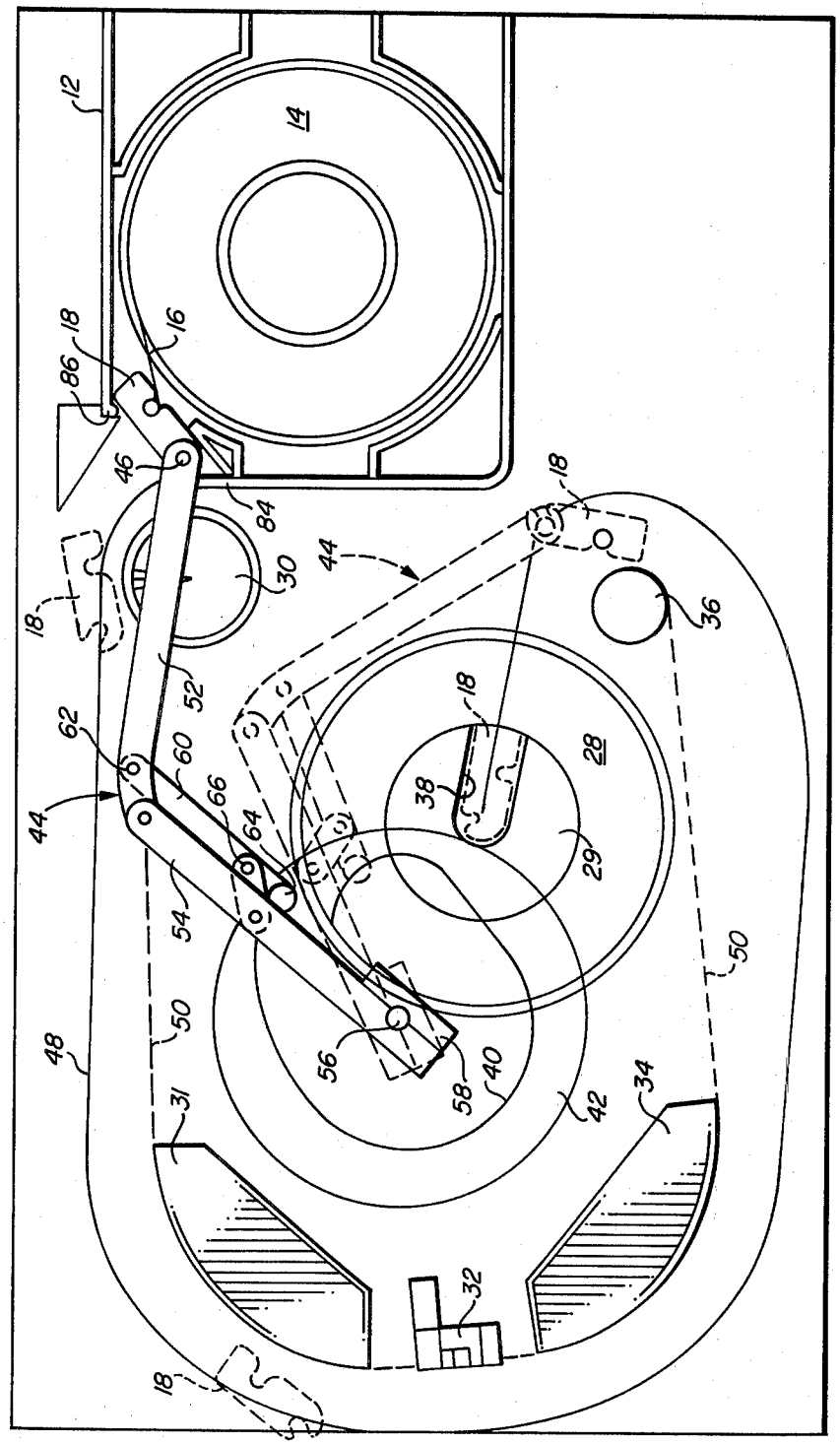
FIG. 2 is a top plan view of the tape drive of FIG. 1 showing two positions of the pantocam arm.

The automatic threading apparatus of the present invention performs the same two general functions. The moving and guiding function is implemented, as shown in FIG. 1, by a cam groove 40 formed in a cam substrate 42. A pantoarm mechanism 44 follows the cam groove 40 to define the circumvoluted path that the leader block 18 and the tape 16 will follow. FIGS. 2, 3 and 4 show the details of the cam groove 40 and the pantoarm mechanism 44. A threading pin 46 couples to the leader block 18 with the pin 46 travelling through the circumvoluted tape path to the take-up reel 28 as will be described further in FIG. 2.

In FIG. 2, the pantocam mechanism 44 is shown in two positions. The first position in solid line shows the pantoarm mechanism 44 in contact with the leader block 18. In this position the pantoarm mechanism 44 through the threading pin 46 is ready to pull the leader block 18 out of the cartridge 12 to unreel the magnetic tape 16 from the supply reel 14. The pantoarm mechanism 44 is shown in dashed lines as the mechanism is directing the leader block 18 around roller 36 of the tension transducer 37. In the dashed line position, the pantoarm mechanism 44 is getting ready to place the leader block 18 into the slot 38 in hub 29 of the take-up reel 28. Again the leader block 18 is shown in phantom lines in the slot 38. Likewise, several positions of the leader block 18 are shown in phantom positions along a path of the leader block 18 shown as a line identified by the reference numeral 48. The magnetic tape 16 takes the path shown in the dashed lines identified by the reference numeral 50.

Besides the threading pin 46, the pantoarm mechanism 44 for the preferred embodiment includes a follower linkage 52 which has the threading pin 46 attached to it at one end. The opposite end of the follower linkage 52 is pivotally connected to a shaft linkage 54. The shaft linkage 54 is connected for a sweeping motion to a shaft 56 by a connecting block 58. The shaft 56 together with a motor (not shown) attached to the shaft 56 provide the sweeping motion to the shaft linkage for pulling the leader block 18 and the magnetic tape 16 through the tape drive. The follower linkage 52 together with the shaft linkage 54 form a broken arm linkage between the shaft 56 and the threading pin 46.

Cam linkage 60 is pivotally connected at point 62 to the follower linkage 52. A follower bearing 64 is pivotally connected to the opposite end of the cam linkage 60. The follower bearing 64 fits into the cam groove 40. A connecting linkage 66 pivotally interconnects cam linkage 60 to the shaft linkage 54. The connecting linkage 66 causes the cam linkage 60 to be pulled through the sweeping motion when the shaft 56 rotates which causes the shaft linkage 54 to sweep through the tape drive apparatus. The follower bearing 64 will follow the cam groove 40 with the cam linkage 60 thereby determining the extension of the follower linkage 52 as the follower bearing 64 follows the outline of the cam groove 40.

FIG. 3 shows a top plan view of only the cam substrate 42 with the preferred outline of the cam groove 40 together with the preferred linkage embodiment of the pantoarm mechanism 44. In FIG. 3, the follower linkage 52 is shown in the position where the threading pin 46 is placed in the center of rotation of the take-up reel 28. A pin 68 is shown placed within an aligner block 70 for the precise positioning of the threader pin 46. The follower bearing 64 is shown at the opposite end of the cam groove 40 to that shown in FIG. 2. In this position, the follower linkage 52 is at its shortest extent as determined by the cam groove 40.

FIG. 4 shows the side plan view of the assembly of FIG. 3. In FIG. 4 a motor 71 is shown which provides the rotary motion to the shaft 56. The elevation of the different linkage of the pantoarm mechanism 44 can be seen in FIG. 4 as well as cam groove 40 of the substrate 42.

The coupling action of the leader block 18 to the threading pin 46 is shown in FIGS. 5A and 5B. In FIG. 5A, the leader block 18 is shown connected to the magnetic tape 16 by cylinder 72 of a soft plastic material, for instance. The threading pin 46 is shown connected to the follower linkage 52. The threading pin 46 includes an elongated cylinder section 74 having a smaller diameter than that of the cylinder section 76. The cylinder section 74 easily passes into the cutout section 78 in the leader block 18. The cutout section 78 also includes a larger cutout section 80 for mating with the larger cylinder section 76 of the threading pin 46 as shown in FIG. 5B.

In FIG. 5B, the cartridge has been inserted in the loading position where the cutout section 78 passes over the cylinder section 74 of the threading pin 46. The cartridge is then placed into an operating position by moving the cartridge in a downward movement as shown by the arrow. The leader block 18 also moves in a downward direction axial to the threading pin 46 thereby causing the larger cutout section 80 to capture the larger cylinder section 76 of the threading pin 46. The leader block 18 is thereby firmly captured by the threading pin 46 and will follow the motion of the follower linkage 52 as it sweeps through the operational path of the tape drive. The leader block 18 includes a boss protruding from the tip of the leader block 18. The boss 82 coacts with a portion 84 of the cartridge 12, see FIG. 2. The boss 82 and the portion 84 of the cartridge 12 together with the opposite end of the leader block 18 and the portion 86 of the cartridge 12 provide a closure to the interior of the cartridge 12. The boss 82 prevents the leader block 18 from falling out of the entrance to the cartridge 12.

In operation, the cartridge 12 is loaded into the tape drive unit with the pantocam mechanism 44 placed into the position shown in FIGS. 1 and 2. As the cartridge 12 is inserted into the loading mechanism 24, the cutout section 78 of the leader block 18 interconnects with the cylinder section 74 of the threading pin 46, see FIG. 5A. When the cartridge 12 is moved into the operating position against spring 27, the larger cutout section 80 of the leader block 18 passes over the larger cylinder section 76 of the threading pin 46 to perform the positive interconnection, as shown in FIG. 5B. The motor 71, see FIG. 4, rotates the shaft 56 thereby causing the follower linkage 52 through the shaft linkage 54 to pull the leader block 18 out of the opening to the cartridge 12. The shaft 56 continues to rotate causing the circumvoluted leader block 18 to follow the path identified by the reference numeral 48 and the magnetic tape 16 to follow the circumvoluted tape path 50. The magnetic tape 16 is directed around roller guide 30, air bearing guide 31, magnetic transducer 32, air bearing guide 34, and roller 36 of the tension transducer 37. The extension of the follower linkage 52 is determined by the cam linkage 60 as connected to the follower bearing 64 and the cam grooove 40. As the follower bearing 64 reaches the opposite end of the cam groove 40, the follower linkage 52 positions the threading pin 46 at the center of rotation of the take-up reel 28, as shown in FIG. 3.

The pin 68 is placed within the aligner block 70 and the leader block 18 is snugly placed within the slot 38 in the hub 29. The motor connected to the take-up reel 28 is activated to wind the magnetic tape 16 around the hub 29. After the utilization of the recorded informaton from or recording information on the magnetic tape 16, the rereeling operation is performed to return the magnetic tape 16 and the leader block 18 into its cartridge 12.

In the reverse rotation either the reverse rotation of the drive motor 20 or both the reverse rotation of the motor 20 and the reverse rotation of the shaft 56 by the motor 71 causes the pantocam mechanism 44 to travel the reverse direction back to the cartridge 12. The magnetic tape 16 pulls the leader block 18 from the slot 38 of the hub 29 and the follower linkage 52 either is pulled along or is driven by the shaft 56 to reverse the direction along the circumvoluted paths 48 and 50. At the end of the reverse rotation, the leader block 18 is snugly placed within the cartridge 12. The shaft 56 provides the last motion to the follower linkage 52 and the threading pin 46 to drive the boss 82 of the leader block 18 into a locking arrangement with portion 84 of the cartridge 12. The cartridge 12 is unloaded by an upward motion which frees the leader block 18 from larger cylinder section 76 of the threading pin 46 and the cartridge is free to be removed for replacement.

The principles of the present invention have now been made clear in an illustrative embodiment. There will be immediately obvious to those skilled in the art many modifications of the structure, arrangement, proportions, the elements, materials and components used in the practice of the invention. For instance, many different types of latching arrangements may be substituted for the interconnection of the pantoarm mechanism 44 to the magnetic tape 16 of the preferred embodiment. Further, many different cartridge shapes as well as the inteconnection of the leader block 18 to the take-up reel 28 can be substituted without departing from the present invention. It should be evident that the particular circumvoluted tape path 50 taken by the magnetic tape 16 is for purposes of the disclosure of the preferred embodiment, and it should be evident that the transducer 32 and the coated side of the magnetic tape 16 could be placed on the outside of the tape path 50 without departing from the present invention. Further, the preferred mechanism shown for the pantoarm mechanism 44 is illustrative of the preferred embodiment and other linkages could be determined by those skilled in the art again without departing from the present invention.

To increase the complexity and increase the circumvolution of the tape path, the cam groove 40 may cover no more than the approximately 360° radius that is shown in the figures. The cam substrate 42 could be mounted for rotation by a motor such as motor 71 for instance, such that the rotation of the cam groove 40 is timed with respect to the rotation of shaft 56. The rotation of the cam substrate 42 would permit a more complex tape path to be covered by the tape 16, since the cam groove 40 determines the extension of the pantoarm mechanism 44 through cam linkage 60. Further the rotation of the cam groove 40 may be in the same or opposite direction to the rotation of the shaft 56. The appended claims are, therefore, intended to cover and embrace any such modification within the limits only of the true spirit and scope of the invention.

What is claimed is:

1. In an automatic threading apparatus for moving a leading end of a web of material wrapped on a supply reel positioned on a web transport, over a web path from a first predefined position to a second position which couples the leading end to a take-up reel disposed on the web transport for subsequent rotational movement with the take-up reel, said threading apparatus comprising in combination:

a cam having a given axis and a groove defining the complex web path circumvoluted about said given axis;

a pantoarm assembly having first and second connection ends;

rotating means connected to said first connection end of said pantoarm assembly and rotatable about said given axis;

a device adapted to couple to the leading end of the web at the first predetermined position, said device attached to said second connection end of said pantoarm assembly;

means connecting said pantoarm assembly intermediate said connection ends to said cam groove, wherein said rotating means causes said pantoarm assembly to describe a circumvoluted path with said connecting means following said cam groove to cause the pantoarm assembly to move through the complex web path to direct said device from the first defined position to the second position.

2. A threading apparatus as defined in claim 1 wherein said pantoarm assembly includes a two-arm broken-arm linkage assembly having one arm connected at a free end as said first connection end to said rotating means and the free end of the second arm as said second connection end connected to said device.

3. A threading apparatus as defined in claim 2 wherein said connecting means includes a follower bearing and a cam linkage, said follower bearing being adapted to move along said cam groove and journaled to one end of said cam linkage, the second end of said cam linkage being pivotally connected to the second arm of said broken arm linkage.

4. A threading apparatus as defined in claim 3 further including a connecting linkage coupling said cam linkage of the first arm of said broken arm linkage.

5. A threading apparatus as defined in claim 1 wherein the supply reel is replaceable and a leader block is attached to the leading end of the web with said device being adapted to be selectively coupled to the leader block.

6. A threading apparatus as defined in claim 5 wherein the web of material is a magnetic tape and together with the supply reel are enclosed in a replaceable cartridge.

7. A threading apparatus as defined in claim 6 wherein said device is a threading pin having a thinner diameter section to pass into a slot in the leader block and a larger diameter section that is encompassed by an opening at an end in the slot of the leader block for the selective coupling between said device and the leader block with relative axial motion therebetween.

8. In an automatic apparatus for threading a leading end of the web of material wrapped on a supply reel positioned on a web transport, over a web path from a first predefined position to a second position which couples the leading end to a take-up reel disposed on the web transport for subsequent rotational movement with the take-up reel, said threading apparatus comprising in combination:

a cam having a groove for defining a complex guide path;

a pantoarm assembly having a follower linkage pivotally connected together at one end of each of said linkages, each linkage having a second end remote from said one end;

rotating means connected to a second end of said shaft linkage for rotating said shaft linkage in a sweeping motion;

a device adapted to couple to the leading end of the web at the first predetermined position, said device connected to a second end of said follower linkage; and cam connecting linkage means pivotally connected at one end thereof to said follower linkage adjacent to its pivotal connection to said shaft linkage and at a second end thereof to said cam groove for causing said follower linkage to radially extend with respect to said rotating means to a distance depending upon the shape of said cam groove.

9. A threading apparatus as defined in claim 8 wherein said cam connecting linkage means includes a follower bearing and a cam linkage, said follower bearing being adapted to move along said cam groove and journalled to one end of said cam linkage, the second end of said cam linkage being pivotally connected to said follower linkage.

10. A threading apparatus as defined in claim 9 further including a connecting linkage coupling said cam linkage to said shaft linkage.

11. A threading apparatus as defined in claim 8 wherein the supply reel is replaceable and a leader block is attached to the leading end of the web with said device being adapted to be selectively coupled to the leader block.

12. A threading apparatus as defined in claim 11 wherein the web of material is a magnetic tape and together with the supply reel are enclosed in a replaceable cartridge.

13. A threading apparatus as defined in claim 12 wherein said device is a threading pin having a thinner diameter section to pass into a slot in the leader block and a larger diameter section that is encompassed by an opening at an end in the slot of the leader block for the selective coupling between said device and the leader block with relative axial motion there between.

14. A threading apparatus as defined in claim 8 wherein said cam is adapted for rotation.

15. In an automatic threading apparatus for moving a leader block attached to the leading end of a web of material wrapped on a supply reel positioned on a web transport over a complex web path from a first predefined position to a second position which couples said leader block to a take-up reel disposed on said transport for subsequent rotational movement with said take-up reel, said threading apparatus comprising in combination:

a cam substrate having a cam groove formed therein defining a complex guide path;

a cam linkage;

a follower bearing adapted to move along said cam groove and connected to one end of said cam linkage;

a shaft linkage mounted to a shaft at one end for sweeping an approximate circular path;

a follower linkage having one end pivotally connected to said shaft linkage with said cam linkage pivotally connected to said follower linkage adjacent to the same end to which said shaft linkage is connected;

a connecting linkage interconnecting said shaft linkage and said cam linkage along their respective lengths; and a device adapted to releasably couple said leader block to said device at said first predetermined position, said device being coupled to the free end of said follower linkage;

wherein causing said shaft linkage to describe a circular path causes the follower bearing to follow said cam groove and thereby to cause the follower linkage to swing through a complex path to move said device from the first defined position to the second position while carrying the web along a complex tape path.

16. The apparatus set forth in claim 1 wherein said web transport has a web cartridge receiving station in juxtaposition to said first defined position for receiving a reel-containing cartridge having a tape attached to a leader block exposed at said first defined position when in said receiving station;

said web path having a first portion extending from said first defined position in a general U-shape and said cam being disposed within the U-shape of the web path, said web path further including a circumvolute portion extending between said second position and a leg of the U-shape remote from said first defined position with said second position being disposed at an end of said circumvolute portion and intermediate the distal ends of the U-shaped portion of the web path;

a take-up web reel disposed adjacent said second position and having a leader block receiving cavity opening to said second position when the take-up reel is in a web-loading rotational position;

means coupled to said station for being coupled to the reel in said reel-containing cartridge and to said take-up reel for co-rotating said reels to transport the web therebetween and over said web path;

control means coupled to said reel-coupled means to hold said take-up reel in said web-loading rotational position and coupled to said rotating means for activating same to rotate said pantocam assembly from said first defined position to said second position and to automatically insert said leader block into said cavity such that the web transport is completely prepared to transport the web between said reels.

17. The machine-implemented method of automatically threading a web over a circumvoluted path having a first position for receiving a web and a second position having means for winding the web transported from said first position over said circumvoluted path; said path being convoluted about a given axis;

including the machine-executable steps of:

taking a leading free end of a web to be received at said first position in a web holder;

rotating a pantographic linkage supporting said web holder about an axis of rotation parallel to said given axis and lying within a circumvolution of said web path;

adjusting said pantographic linkage during said rotation to alter the path traversed by said web holder from a circular path to a path substantially similar to said circumvoluted path such that the web is disposed approximately in said circumvoluted path by said rotation; and attaching said web to said means for winding.

18. In an automatic threading apparatus for moving a leading end of a web of material coiled on a supply reel positioned on a web transport over a web path from a first tape position to a second tape position for coupling the leading end to a take-up reel on the web transport for enabling ensuing tape transport between the reels by co-rotation thereof, said tape path having a circumvoluted shape;

comprising, in combination:

a plate-like cam on the web transport having a given axis and having a groove circumvoluted about said given axis in a first predetermined shape;

a pantoarm assembly having a first arm relatively rotatably secured to said cam at said given axis for relative rotation thereabout and having a free end, a second arm pivotally secured to said first arm adjacent said free end and extending to said first tape position when said first arm and cam are in a first rotational position and to said second tape position when said first arm and cam are in a second rotational position, a third arm pivotally secured to said second arm adjacent to and spaced from said pivot between said first and second arms and having a free end disposed over said groove, and a fourth arm pivotally secured to said third arm intermediate said third arm free end and said pivot of said third and second arms and pivotally secured to said first arm intermediate said given axis and said pivot between said first and second arms;

means in said transport connected to said cam for relatively rotating the first arm and cam between said first and second rotational positions;

a cam follower attached to the third arm adjacent its said free end and extending into said groove for translating said relative rotation of said first arm with respect to said cam to said pantoarm assembly; and tape free-end engaging means attached to said second arm adjacent its free end and extending to said first and second tape positions when said first arm and cam are in said first and second relative rotational positions, respectively, such that as said first arm and cam reciprocatingly rotate between said first and second rotational positions the free end of said second member translates between the first and second tape positions to thereby enable said tape free-end engaging means to move said tape through a circumvoluted tape path between said first and second tape positions defined by said groove and said pantoarm assembly.

* * * * *